United States Patent
Lee

(10) Patent No.: US 10,146,996 B2
(45) Date of Patent: Dec. 4, 2018

(54) DISPLAY DEVICE CONFIGURED TO COMPENSATE LUMINANCE BASED ON REFLECTED LIGHT

(71) Applicant: SAMSUNG DISPLAY CO., LTD., Yongin-si, Gyeonggi-do (KR)

(72) Inventor: Min-Tak Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 21 days.

(21) Appl. No.: 14/511,080

(22) Filed: Oct. 9, 2014

(65) Prior Publication Data
US 2015/0187258 A1    Jul. 2, 2015

(30) Foreign Application Priority Data
Dec. 30, 2013  (KR) .................. 10-2013-0166976

(51) Int. Cl.
*G06K 9/00* (2006.01)
*G09G 3/3233* (2016.01)

(52) U.S. Cl.
CPC ....... *G06K 9/00604* (2013.01); *G09G 3/3233* (2013.01); *G09G 2320/028* (2013.01); *G09G 2320/0233* (2013.01); *G09G 2320/0673* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| 5,331,149 A * | 7/1994 | Spitzer .................. A61B 3/113 250/221 |
| 2002/0101166 A1 | 8/2002 | Weindorf et al. |
| 2008/0198151 A1* | 8/2008 | Lee .......... G09G 3/36 345/207 |
| 2010/0059660 A1 | 3/2010 | Satoh et al. |
| 2012/0120037 A1* | 5/2012 | Shin ..................... G09G 3/3406 345/207 |

(Continued)

FOREIGN PATENT DOCUMENTS

| KR | 10-2005-0098686 A | 10/2005 |
| KR | 10-2006-0057405 A | 5/2006 |
| KR | 10-2010-0091113 A | 8/2010 |

*Primary Examiner* — David D Davis
(74) *Attorney, Agent, or Firm* — Lewis Roca Rothgerber Christie LLP

(57) ABSTRACT

A display device includes: a display unit configured to display an image; a camera spaced apart from the display unit and facing a front side of the display device; a photo sensor spaced apart from the camera and configured to sense ambient light incident on the front side of the display device; and a control unit coupled to the display unit, the camera, and the photo sensor. The control unit includes: a viewing angle determining unit configured to recognize a face of a user from an image photographed by the camera so as to determine a viewing angle of the user; a reflection intensity calculating unit configured to calculate intensity of reflected light based on intensity of symmetric light incident at an angle symmetric to the viewing angle; and a luminance compensation unit configured to compensate luminance of input video data in consideration of the intensity of the reflected light.

11 Claims, 6 Drawing Sheets

(56) References Cited

U.S. PATENT DOCUMENTS

| | | | |
|---|---|---|---|
| 2013/0100097 A1* | 4/2013 | Martin | G01J 1/4204 345/207 |
| 2013/0207887 A1* | 8/2013 | Raffle | G02B 27/00 345/156 |
| 2015/0145883 A1* | 5/2015 | Marti | G09G 3/20 345/592 |

* cited by examiner

DISPLAY DEVICE CONFIGURED TO COMPENSATE LUMINANCE BASED ON REFLECTED LIGHT

CROSS-REFERENCE TO RELATED APPLICATION

This application claims priority to and the benefit of Korean Patent Application No. 10-2013-0166976, filed on Dec. 30, 2013, in the Korean Intellectual Property Office, the entire disclosure of which is incorporated herein by reference in its entirety.

BACKGROUND

1. Field

Embodiments of the present invention relate to a display device of which luminance is adjusted in consideration of a specular reflection component affecting vision of a user.

2. Description of Related Art

A flat panel display has been recently developed as a display device. Examples of flat panel displays include a liquid crystal display, a field emission display, a plasma display panel, and an organic light emitting display. These flat panel display devices are advantageous over conventional display devices using a cathode ray tube by virtue of a relatively light weight and small volume.

However, these flat panel display devices exhibit relatively low contrast due to incident ambient light. In order to improve the contrast, an ambient light sensing unit such as a photo sensor may be disposed on the flat panel display device, such that luminance is adjusted in accordance with ambient light conditions. Further, light reflected from a surface of the display device may also affect vision of a user, and thus it may be desirable to adjust luminance in consideration of specular reflection from the surface of the display device.

SUMMARY

Aspects of embodiments of the present invention relate to a display device in which luminance is adjusted in consideration of specular reflection of incident ambient light reflected from a surface of the display device to eyes of a user.

According to an embodiment of the present invention, a display device includes a display unit, a camera, a photo sensor, and a control unit. The display unit is configured to display an image. The camera is spaced apart from the display unit and faces a front side of the display device. The photo sensor is spaced apart from the camera and is configured to sense ambient light incident on the front side of the display device. The control unit is coupled to the display unit, the camera, and the photo sensor. The control unit includes a viewing angle determining unit, a reflection intensity calculating unit, and a luminance compensation unit. The viewing angle determining unit is configured to recognize a face of a user from an image photographed by the camera so as to determine a viewing angle of the user looking at the display device. The reflection intensity calculating unit is configured to calculate intensity of reflected light based on intensity of symmetric light incident at an angle symmetric to the viewing angle among the ambient light detected by the photo sensor. The luminance compensation unit is configured to compensate luminance of input video data in consideration of the intensity of the reflected light calculated by the reflection intensity calculating unit.

The viewing angle determining unit may be configured to determine pupil locations of the user.

The viewing angle determining unit may be configured to determine the viewing angle with respect to a center point between the pupil locations.

The photo sensor may include a plurality of photosensitive pixels having individual coordinates.

The luminance compensation unit may be configured to compensate a gamma value by adding a gray level value corresponding to the intensity of the reflected light to a gray level value of the input video data.

The luminance compensation unit may be configured to compensate a gamma value by changing the gamma value in consideration of the intensity of the reflected light.

The reflection intensity calculating unit may contain information on photo reflectance of the display device.

The camera may be a CCD camera or a CMOS camera.

According to another embodiment of the present invention, a display device includes a display unit, a camera, and a control unit. The display unit is configured to display an image toward a front side of the display device. The camera is spaced apart from the display unit and faces the front side of the display device. The control unit is coupled to the display unit and the camera. The control unit includes a viewing angle determining unit, a reflection intensity calculating unit, and a luminance compensation unit. The viewing angle determining unit is configured to recognize a center point between pupils of a user from an image photographed by the camera. The reflection intensity calculating unit is configured to determine a symmetric point of ambient light and to calculate intensity of reflected light based on a viewing angle determined from the viewing angle determining unit. The luminance compensation unit is configured to compensate luminance in accordance with the intensity of the reflected light calculated by the reflection intensity calculating unit.

The viewing angle determining unit may be configured to determine the viewing angle with respect to the center point between the pupils of the user.

The luminance compensation unit may be configured to compensate a gamma value by adding a gray level value corresponding to the intensity of the reflected light to a gray level value of input video data.

The luminance compensation unit may be configured to compensate a gamma value by changing the gamma value in consideration of the intensity of the reflected light.

The camera may be a CCD camera or a CMOS camera.

According to aspects of embodiments of the present invention, the display device provides improved visibility because luminance is adjusted in consideration of intensity of specular reflection of incident ambient light reflected from a surface of the display device to eyes of a user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present invention will be more clearly understood from the following detailed description taken in conjunction with the accompanying drawings, in which.

DETAILED DESCRIPTION

Figure 1:
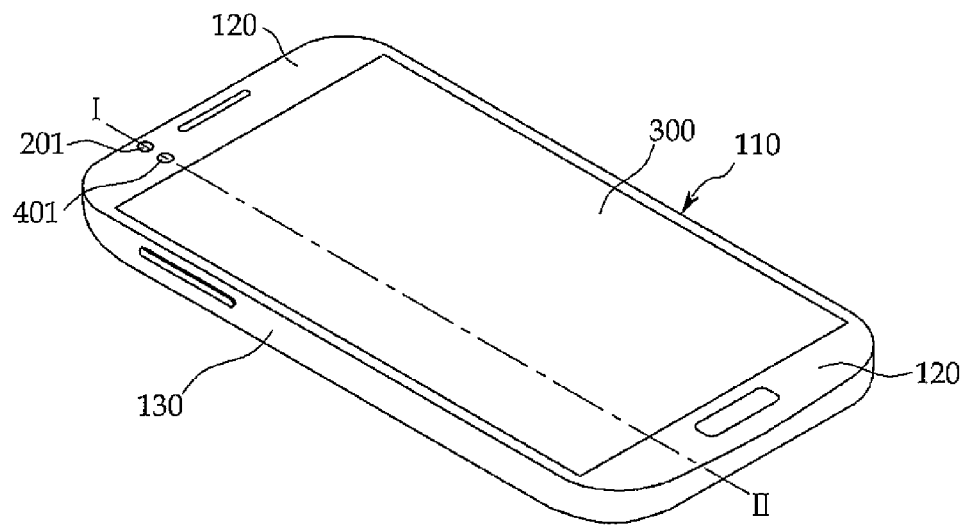
FIG. 1 is a perspective view showing a display device according to an embodiment of the present invention.

Hereinafter, embodiments of the present invention will be described in more detail with reference to the accompanying drawings.

Although embodiments of the present invention can be modified in various manners and there may be several embodiments, specific example embodiments are illustrated in the accompanying drawings and will be mainly described in the specification. However, the scope of embodiments of the present invention is not limited to the specific example embodiments and should be construed as including all the changes, equivalents, and substitutions included in the spirit and scope of the present invention.

In the drawings, certain elements or shapes may be simplified or exaggerated to better illustrate embodiments of the present invention, and other elements present in an actual product may also be omitted. Thus, the drawings are intended to facilitate the understanding of the present invention. Like reference numerals refer to like elements throughout the specification.

Throughout the specification, when an element is referred to as being "connected" or "coupled" to another element, the element may be "directly connected" to the other element, or "electrically connected" to the other element with one or more intervening elements interposed therebetween. It will be further understood that the terms "comprises," "comprising," "includes" and/or "including," when used in this specification, specify the presence of the stated features, integers, steps, operations, elements, and/or components, but do not preclude the presence or addition of one or more other features, integers, steps, operations, elements, components, and/or groups thereof.

In addition, when a layer or element is referred to as being "on" another layer or element, the layer or element may be directly on the other layer or element, or one or more intervening layers or elements may be interposed therebetween.

FIG. 1 is a perspective view showing a display device according to an embodiment of the present invention.

A display device of FIG. 1 is a mobile phone including a window 110 on the front side of the display device, a lower case 130 coupled to the window 110 to form an accommodation area, and a display unit 300 in the accommodation area formed by the window 110 and the lower case 130.

A bezel unit 120 is further disposed at the edge of the window 110, and an opaque coating layer may be formed on the bezel unit 120. The coating layer on the bezel unit 120 is selectively removed, such that a camera hole 201 and a photo sensor hole 401 are formed in the bezel unit 120.

Figure 2:
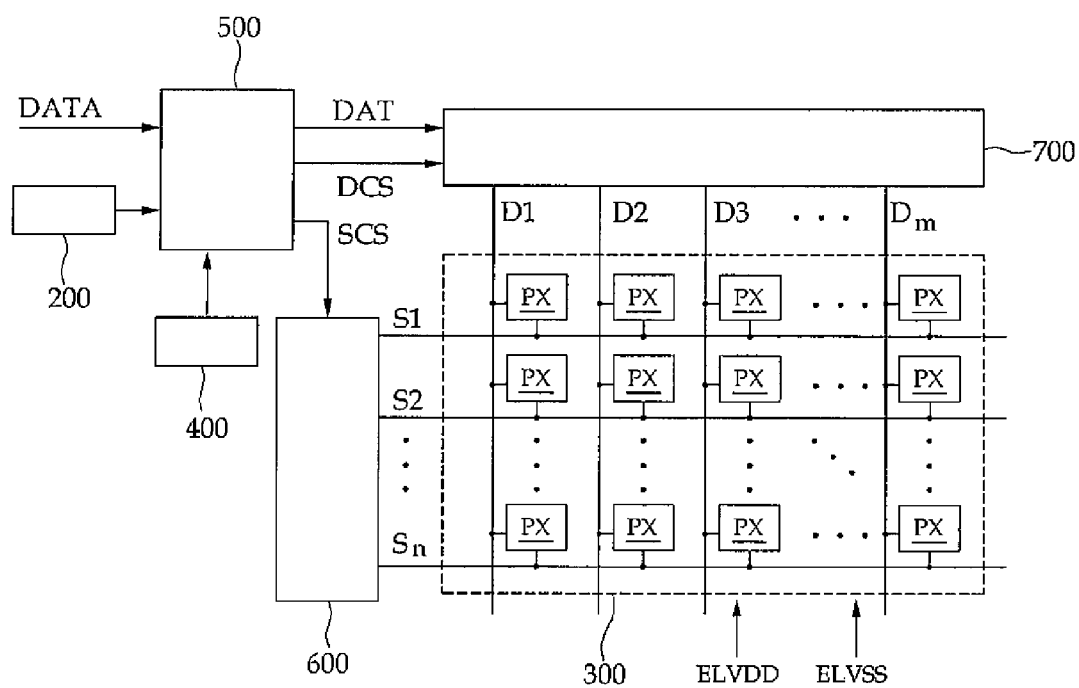
FIG. 2 is a block diagram showing the display device of FIG. 1.

FIG. 2 is a block diagram showing the display device of FIG. 1.

Referring to FIG. 2, the display device includes a display unit 300, a control unit 500, a scanning drive unit 600, and a data drive unit 700, and further includes a camera 200 and a photo sensor 400 connected (or coupled) to the control unit 500.

The control unit 500 produces a data drive control signal DCS and a scanning drive control signal SCS in response to synchronous signals supplied by an external device. The data drive control signal DCS produced by the control unit 500 is transmitted to the data drive unit 700, whereas the scanning drive control signal SCS is transmitted to the scanning drive unit 600. Further, the control unit 500 transmits a data signal DAT supplied by the external device to the data drive unit 700.

Figure 3:
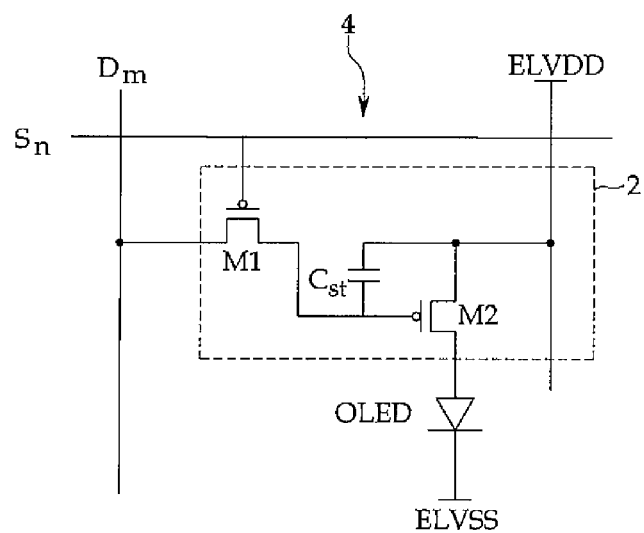
FIG. 3 is a circuit diagram showing a pixel of FIG. 2.

The scanning drive unit 600 is connected (or coupled) to scanning lines S1~Sn of the display unit 300, and applies a scanning signal consisting of a gate on voltage Von for turning on a switching device M1 of FIG. 3 and a gate off voltage Voff for turning off the switching device M1, to the scanning lines S1~Sn.

The data drive unit 700 is connected (or coupled) to data lines D1~Dm of the display unit 300, and selects a gray-level or gray-scale voltage in accordance with the data signal DAT supplied by the control unit 500. The data drive unit 700 applies the selected gray-level or gray-scale voltage to the data lines D1~Dm as a data signal.

The display unit 300 includes the plurality of scanning lines S1~Sn, the plurality of data lines D1~Dm, and a plurality of pixels PX. The plurality of pixels are connected (or coupled) to the plurality of scanning lines S1~Sn and the plurality of data lines D1~Dm and are roughly arranged in a matrix form. The scanning lines S1~Sn are extended roughly in a row direction and are almost (e.g., substantially) parallel to one another, whereas the data lines D1~Dm are extended roughly in a column direction and are almost (e.g., substantially) parallel to one another.

The display unit 300 receives power and supplies the power to each pixel PX. In a case where the scanning signal is applied, each of the pixels PX receives the data signal, and then drives a display element in response to the data signal.

The camera 200 photographs from the front side of the display device and then transmits the information to the control unit 500.

The photo sensor 400 measures illumination of ambient light incident from the front side of the display device, converts the illumination information to an electric signal, and then transmits the signal to the control unit 500.

The control unit 500 controls the scanning drive unit 600 and the data drive unit 700 in accordance with the signal from the photo sensor 400.

In one embodiment, each of the photo sensor 400, the control unit 500, the scanning drive unit 600, and the data drive unit 700 may be provided in a form of an integrated circuit chip disposed directly on the display unit 300 or on a flexible printed circuit film, or provided in a form of a tape carrier package (TCP) disposed on the display unit 300 or on a separate printed circuit board. In another embodiment, the photo sensor 400, the control unit 500, the scanning drive unit 600 and the data drive unit 700 may be integrated into the display unit 300 with the scanning lines S1~Sn and the data lines D1~Dm.

According to an embodiment, the display unit 300 includes a display element. The display element may include, for example, an organic light emitting display, a liquid crystal display, and/or an electrophoretic display EPD.

Hereinafter, an organic light emitting display will be described as an example.

FIG. 3 is a circuit diagram showing a pixel of FIG. 2.

Referring to FIG. 3, a pixel 4 of an organic light emitting display includes an organic light emitting diode (OLED) and a pixel circuit 2 which is connected (or coupled) to the data line Dm and the scanning line Sn in order to control the OLED.

An anode electrode of the OLED is connected (or coupled) to the pixel circuit 2, whereas a cathode electrode is connected (or coupled) to an ELVSS power. The OLED generates light having a luminance (e.g., a predetermined luminance) corresponding to current applied by the pixel circuit 2.

In a case where the scanning signal is applied to the scanning line Sn, the pixel circuit 2 controls an amount of current supplied to the OLED in accordance with the data signal applied to the data line Dm. To this end, the pixel circuit 2 includes: a driving transistor M2 coupled between a driving power ELVDD and the OLED; a switching transistor M1 coupled between (or among) the driving transistor M2, the data line Dm, and the scanning line Sn; and a storage capacitor Cst coupled between a gate electrode and a first electrode of the driving transistor M2.

In the switching transistor M1, a gate electrode is connected to the scanning line Sn, a first electrode is connected to the data line Dm, and a second electrode is connected to the gate electrode of the driving transistor M2 and one end of the storage capacitor. In a case where the scanning signal is applied to the scanning line Sn, the switching transistor M1 is turned on and transmits the data signal applied from the data line Dm to the driving transistor M2 and the storage capacitor Cst. The storage capacitor Cst is charged to a voltage corresponding to the data signal.

In the driving transistor M2, the gate electrode is connected to one end of the storage capacitor Cst, a first electrode is connected to the other end of the storage capacitor Cst and to the driving power ELVDD, and a second electrode is connected to the anode electrode of the OLED. The driving transistor M2 controls an amount of current flowing from the driving power ELVDD to the OLED in accordance with a voltage value stored in the storage capacitor Cst. The OLED generates light corresponding to the amount of current supplied via the driving transistor M2.

The OLED may emit light having one of primary colors. The primary colors may refer, for example, to the three primary colors of red, green, and blue and these three primary colors may be mixed spatially or temporally to produce a desired color. In this case, some of the OLEDs may generate white light, such that luminance can be improved. On the other hand, the OLEDs of all the pixels PX may generate white light, and some of the pixels PX may further include color filters (not illustrated) so as to convert white light generated from the OLEDs to light having one of the primary colors.

The switching transistor M1 and the driving transistor M2 may be p-channel field effect transistors (FETs). In one embodiment, at least one transistor between the driving transistor M2 and the switching transistor M1 may be an n-channel field effect transistor. However, a connection relationship among the transistors M1 and M2, the capacitor Cst, and the OLED can be changed. The pixel 4 illustrated in FIG. 3 is an example of the pixels PX included in the display device, and thus the pixel may be provided in other forms including at least two transistors and at least one capacitor.

Hereinafter, a driving method of the display device according to an embodiment will be described in detail.

The control unit 500 receives input video signals R, G, and B from an external device and an input control signal DATA for controlling a display of the input video signals. The video signals R, G, and B contain luminance information of each pixel PX and each luminance value has a number of gray levels (e.g., a predetermined number of gray levels), for example, 1024 ($=2^{10}$), 256 ($=2^8$), or 64 ($=2^6$). In other words, the video signals include gray-level or gray-scale level data. The input control signal DATA includes, for example, a vertical synchronous signal Vsync, a horizontal synchronous signal Hsync, a main clock signal MCLK, and a data enable signal DE.

The control unit 500 processes the input video signals R, G, and B in response to the input video signals R, G, and B and the input control signal DATA in accordance with operating conditions of the display unit 300 and the data drive unit 700, and then produces the data drive control signal DCS and the scanning drive control signal SCS. The scanning drive control signal SCS is transmitted to the scanning drive unit 600, whereas the data drive control signal DCS and the processed data signal DAT are transmitted to the data drive unit 700.

In this case, the control unit 500 determines a gamma value considering an effect of ambient light and processes the data signal DAT. The photo sensor 400 measures illumination of the ambient light and converts the illumination information to an electric signal and transmits the signal to the control unit 500. For example, the photo sensor 400 may provide or display the illumination information by increasing voltage or current in accordance with the increasing illumination. Different gamma values may correspond to (or be assigned to) different reference curves defining a relationship between changes in luminance and changes in gray levels so as to be applied to different illumination environments of measured ambient light, and thus the control unit 500 processes the data signal DAT in accordance with the gamma value corresponding to the intensity of the measured symmetric light among the various gamma values. The reference curves may be obtained and the gamma values may be set corresponding to the intensity of the symmetric light according to any suitable method, including methods known to those skilled in the art.

In one embodiment, the data drive unit 700 receives the data signal DAT from the control unit 500 and selects a gray-level or gray-scale voltage in accordance with the data signal DAT to convert the data signal DAT to an analog data signal. The data drive unit 700 transmits a plurality of data signals over corresponding data lines D1~Dm for a plurality of pixels PX of one corresponding pixel row among a plurality of pixel rows in response to the data drive control signal DCS.

The scanning drive unit 600 applies the gate on voltage Von to the scanning lines S1~Sn to turn on the switching transistor M1 connected to the scanning lines S1~Sn in response to the scanning drive control signal SCS. Each of the data signals applied to the data lines D1~Dm is transmitted to one end of the storage capacitor Cst via the turned-on switching transistor M1 of the corresponding pixel PX. The storage capacitor Cst is charged to a voltage corresponding to the data signal. Accordingly, the driving transistor M2 applies (or turns on) current flowing from the driving power ELVDD to the OLED in accordance with the voltage stored in the storage capacitor Cst. Consequently, the OLED generates light corresponding to the supplied current amount through the driving transistor M2.

According to an embodiment, the process is repeated every 1 horizontal period (1H, the same as periods of the horizontal synchronous signal Hsync and the data enable signal DE), the gate on voltage Von is thus sequentially applied to all scanning lines S1~Sn, and consequently the data signals are supplied to all pixels PX to display an image of a frame.

Figure 4:
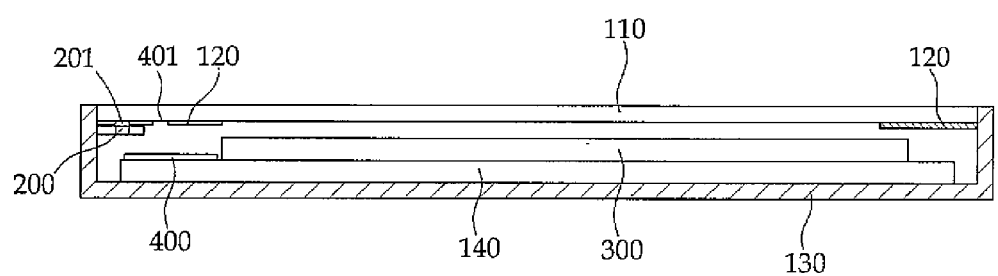
FIG. 4 is a cross-sectional view taken along the line I-II of FIG. 1.

FIG. 4 is a cross-sectional view taken along the line I-II of FIG. 1.

The camera 200 is disposed at a lower portion of the bezel unit 120 of the window 110 and disposed toward (or facing) the front side of the display device to photograph from the front side of the display device.

The display unit 300 is mounted on the lower case 130 with a support unit 140 interposed therebetween. The support unit 140 may be, for example, a cushion material, however embodiments of the present invention are not limited thereto.

The photo sensor 400 is disposed on the support unit 140 outside of the display unit 300. The photo sensor 400 may be disposed at a position exposed to incident light, however, the photo sensor 400 is not limited to the location depicted in FIG. 4. The photo sensor 400 is disposed adjacent to the camera 200. The ambient light is incident on (or to) the photo sensor 400 through the photo sensor hole 401 formed in the bezel unit 120 above the photo sensor 400.

Hereinafter, referring to FIGS. 5 and 6, a method of determining the viewing angle of a user according to an embodiment will be described.

The viewing angle of the user is an angle between a direction in which the user looks at the display unit 300 of the display device and a line perpendicular to a surface of the display device. Referring to FIG. 5, the camera 200 is disposed adjacent to the display unit 300, and thus an angle θ1 at which the user looks at the camera becomes the viewing angle.

Figure 6:
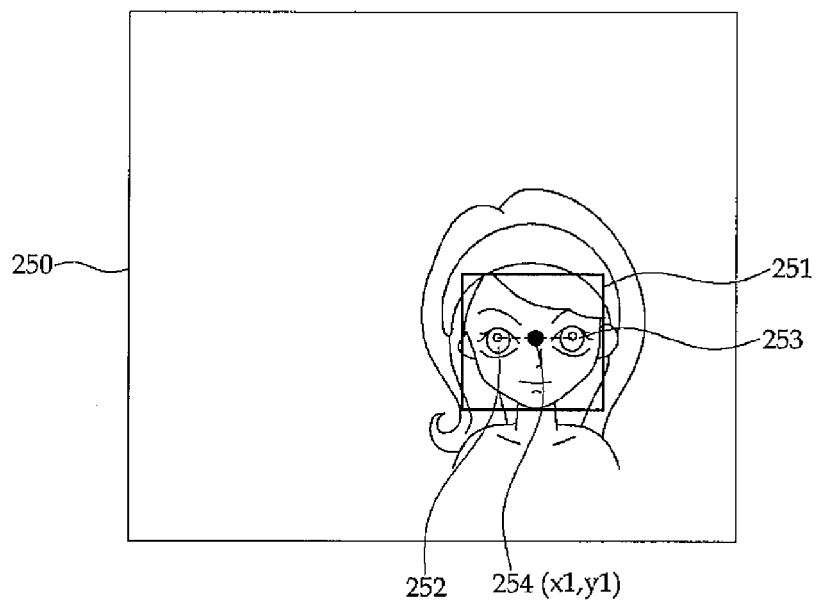
FIG. 6 is a schematic view of an image photographed by the camera according to an embodiment.

Referring to FIG. 6, a method of determining the viewing angle by using an image 250 photographed by the camera will be described. When the user looks at a display device, the camera 200 photographs the user as illustrated in FIG. 6. The information about the photographed image 250 is transmitted to the control unit 500, and thus the control unit 500 recognizes a face of the user. By this face recognition, a face part 251 is determined. A method of recognizing the face may be any suitable method, including methods known to those skilled in the art. For example, face recognition methods used in smart phones and digital cameras can be applied to the face recognition in the present embodiment.

The control unit 500 recognizes the face, and then recognizes pupils 252 and 253. One pupil recognition method may use a difference in brightness between sclera and iris of an eye. In addition, the pupils may be recognized by any suitable method, including an eye tracking method known to those skilled in the art.

Referring to FIG. 6, the two pupils 252 and 253 are recognized, and accordingly a center point between the two pupils is determined as a center point of the pupils 254. When the center point of the pupils 254 is determined, coordinates (x1, y1) of the center point of the pupils 254 are determined accordingly.

In one embodiment, the image 250 photographed by the camera is divided into a plurality of cells arranged in a matrix form having an orthogonal arrangement of rows and columns, and then image information about each cell may be generated and coordinates for each cell may be assigned. For each cell forming the photographed image 250, the azimuth angle and the polar angle of the light incident at that portion of the image when it was photographed can be further determined. In other words, an azimuth angle and a polar angle corresponding to each cell may be determined, and the incident angle can be determined accordingly.

The camera may be, for example, a charge-coupled device (CCD) camera or a complementary metal-oxide semiconductor (CMOS) camera, and the CCD camera and the CMOS camera may have (or assign) an azimuth angle and a polar angle corresponding to each cell forming the photographed image.

When the coordinates (x1, y1) of the center point of the pupils 254 are determined, the viewing angle θ1 is determined in accordance with the incident angle corresponding to the coordinates. Thus, the viewing angle θ1 at which the user looks at the display device may be determined (e.g., easily determined) from the photographed image 250. The azimuth angle may also be determined by the coordinates.

Hereinafter, referring to FIGS. 7 and 8, a method of determining a specular reflection component will be described.

In a case where the viewing angle is θ1, ambient light L1 which is specular-symmetric to the user is incident on the window 110 of the display device at an incident angle θ1 which is the same as the viewing angle, and then is reflected from the window 110 at the angle θ1, thereby affecting the viewing angle of the user. This reflection is specular reflection. In general, reflected light affecting luminance of a display device is proportional to intensity of ambient light.

In order to determine the specular reflection directly affecting the viewing angle of the user, intensity of the ambient light incident from the opposite side of the user at the incident angle θ1 is measured, and intensity of reflected light is determined accordingly.

Figure 7:
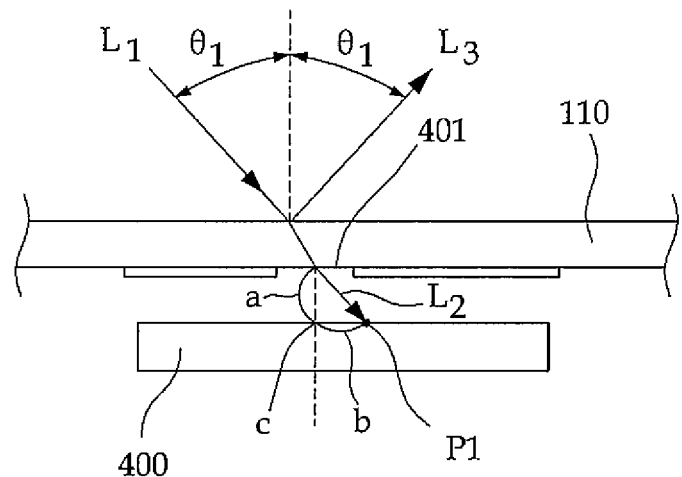
FIG. 7 is a partial cross-sectional view showing a photo sensor of the display device of FIG. 1.

Referring to FIG. 7, the ambient light L1 is incident at the incident angle θ1 which is specular-symmetric to the viewing angle of the user. Among the incident ambient light L1, some of the light L3 is reflected, whereas some of the light L2 is incident on (or to) the photo sensor 400. Hereinafter, symmetric light L2 refers to ambient light incident on (or to) the photo sensor 400 at the same incident angle as the viewing angle θ1 of the user. In other words, the symmetric light L2 refers to the ambient light component having the azimuth angle and the incident angle which are specular-symmetric to the viewing angle.

The symmetric light L2 reaches the photo sensor 400 through the photo sensor hole 401 and is detected at (or from) a point P1 of the photo sensor 400. In FIG. 7, a represents a distance between the window 110 and the photo sensor 400 and b represents a distance between the center point C and the point P1 at which light is detected. A relationship between the incident angle θ1 and the point P1 of the photo sensor 400 can be defined as a Formula (1).

$$\tan \theta_1 = b/a \tag{1}$$

Figure 8:
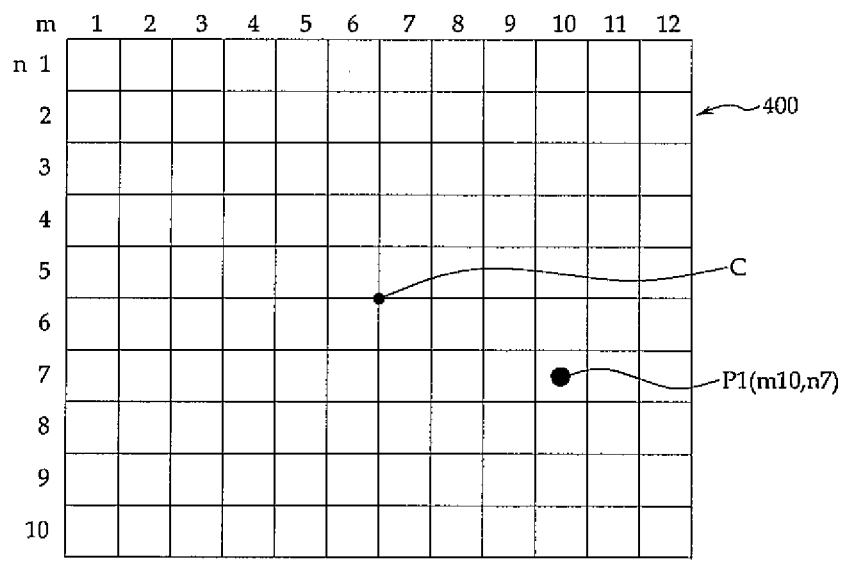
FIG. 8 is a plan view showing an enlarged view of the photo sensor of FIG. 7 according to an embodiment.

An embodiment of the photo sensor 400 is illustrated in FIG. 8. The photo sensor 400 includes photosensitive pixels having individual coordinates while being arranged in a matrix form (m12×n10). A photosensitive pixel disposed at the point P1 at (or from) which the light incident at the angle θ1 is detected has coordinates "m10, n7." Thus, the photo sensor 400 obtains the coordinates P1 (m10, n7) of the pixel at (or to) which the symmetric light L2 is incident, measures intensity of the symmetric light L2, and then converts the information to an electric signal.

Location relationships between each of the photosensitive pixels forming the photo sensor 400 and the photo sensor hole 401 can be determined (e.g., predetermined) with respect to the center point C. In other words, a polar angle and an azimuth angle of the ambient light incident on (or to) each photosensitive pixel forming the photo sensor 400 can be determined (e.g., predetermined) in accordance with a location of each corresponding photosensitive pixel.

In other words, if the viewing angle θ1 of the user is determined, the coordinates of the photosensitive pixel sensing the symmetric light L2 which is specular-symmetric to the viewing angle θ1 of the user can be determined, and accordingly the intensity of the symmetric light L2 incident on (or to) the photosensitive pixel sensing the symmetric light L2 can be determined.

Figure 9:
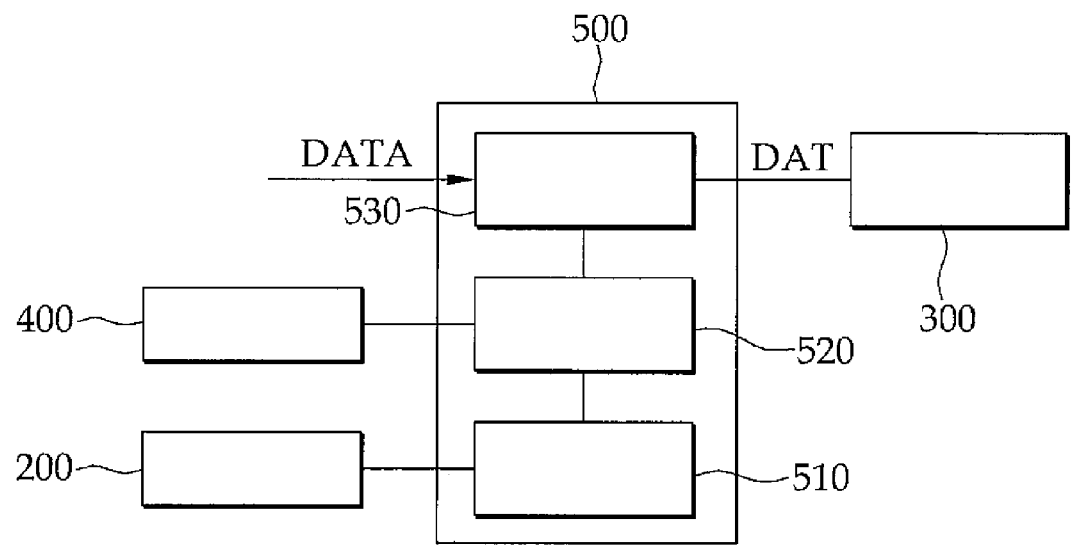
FIG. 9 is a detailed block diagram showing a control unit of the display device of FIG. 2.

FIG. 9 is a block diagram showing a control unit 500 configured to measure the intensity of the symmetric light using the photo sensor 400 of FIG. 8.

Figure 5:
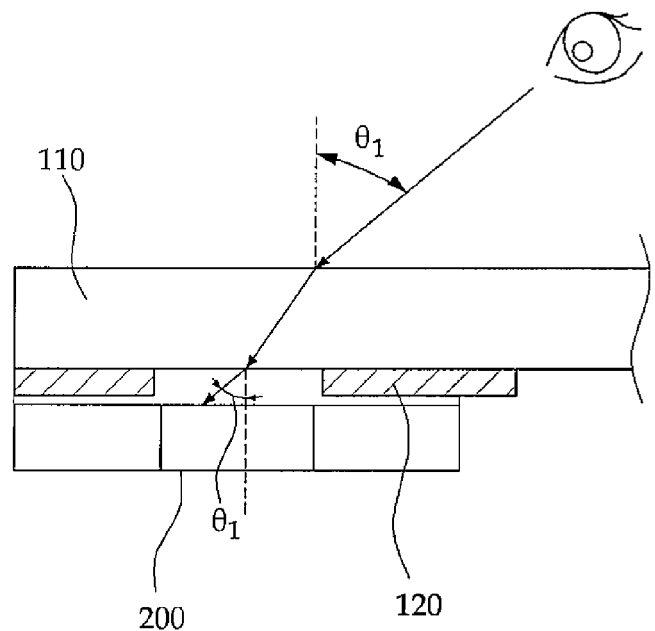
FIG. 5 is a partial cross-sectional view showing a camera of the display device of FIG. 1.

A viewing angle determining unit 510 determines the viewing angle of the user based on the image photographed by the camera 200 according to the method described in FIGS. 5 and 6.

A reflection intensity calculating unit 520 determines intensity of reflected light corresponding to the symmetric light L2 based on the viewing angle determined by the viewing angle determining unit 510, the pixel coordinates determined by the photo sensor 400, and the intensity of the symmetric light L2. Reflectance and transmittance of the window 110 may be taken into account in order to determine the intensity of the reflected light. In other words, in one embodiment the reflection intensity calculating unit contains information on the photo reflectance of the display device. For example, the information about the reflectance value of a surface of the display device may be contained in the reflection intensity calculating unit 520. The information on the intensity of the reflected light is transmitted from the reflection intensity calculating unit 520 to a luminance compensation unit 530.

The luminance compensation unit 530 compensates luminance by taking the intensity of the reflected light into account as an ambient light factor. In one embodiment, the luminance compensation unit 530 receives a gray level value (or gray value) of input video data DATA, carries out gamma value correction in consideration of the intensity of the reflected light, and then transmits output video data DAT to the display unit 300. According to another embodiment, the gamma value can be corrected by adding a gray level value (or gray value) corresponding to the intensity of the reflected light to a gray level value (or gray value) of the input video data DATA instead of changing the gamma value. Otherwise, the gamma value can also be corrected by changing the gamma value in consideration of the intensity of the reflected light.

Hereinafter, another embodiment of the present invention will be described referring to FIGS. 10 and 11.

Figure 10:
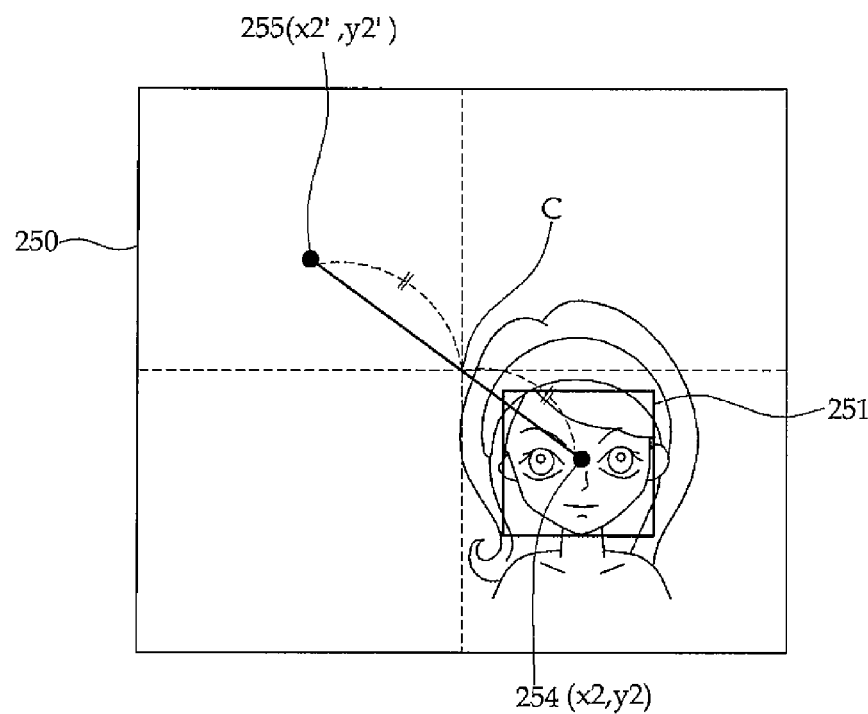
FIG. 10 is a schematic view showing an image photographed by the camera according to an embodiment.

A method of determining a viewing angle of a user and symmetric light (e.g., together at a time) by using an image 250 photographed by a camera is illustrated in FIG. 10.

The image 250 photographed by the camera has a center point C, and each cell forming the image 250 has individual coordinates. According to an embodiment, in the image 250 photographed by the camera, components located in symmetric positions with respect to the center point C of the image are, in practice, located in symmetric positions with respect to the camera regarding both direction and angle.

In other words, a point symmetric to a center point of the pupils 254 with respect to the center point C of the image 250 is the point symmetric to the center point of the pupils 254 regarding both an azimuth angle and a polar angle.

Thus, if the center point of the pupils 254 and coordinates thereof (x2, y2) are determined, a symmetric point 255 of the image 250 and coordinates thereof (x2', y2') are determined accordingly, and according to one embodiment an image recognized from the symmetric point 255 is, in practice, an image recognized by light incident at an angle symmetric to the viewing angle of the user with respect to the camera 200. Consequently, the intensity of the symmetric light can be determined by intensity of light incident at (or to) the point (x2', y2') corresponding to the symmetric point 255.

Figure 11:
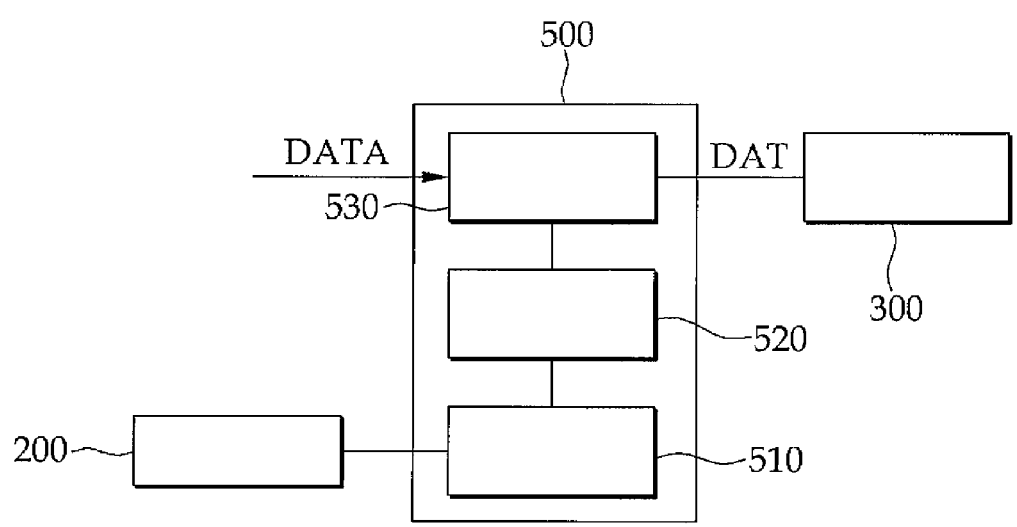
FIG. 11 is a block diagram showing a control unit of a display device according to another embodiment of the present invention.

FIG. 11 is a block diagram showing a control unit 500 configured to measure intensity of the symmetric light by using the image 250 photographed by the camera illustrated in FIG. 10.

A viewing angle determining unit 510 of the control unit 500 determines the center point of the pupils 254 based on information about the image 250 photographed by the camera 200.

A reflection intensity calculating unit 520 determines intensity of reflected light based on the center point of the pupils 254 determined by the viewing angle determining unit 510 and the information about the image 250 photographed by the camera 200 in consideration of the intensity of the symmetric light incident at (or to) the center point of the pupils 254 at a symmetric azimuth angle and a symmetric polar angle. The information about the reflected light intensity is transmitted from the reflection intensity calculating unit 520 to a luminance compensation unit 530.

The luminance compensation unit 530 compensates luminance by taking the intensity of the reflected light into account as an ambient light factor.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A display device comprising:
    a display unit;
    a camera spaced apart from the display unit and facing a front side of the display device;
    a photo sensor spaced apart from the camera and configured to sense ambient light incident on the front side of the display device; and
    a control unit coupled to the display unit, the camera, and the photo sensor,
    wherein the control unit comprises:
        a viewing angle determining unit configured to identify a face of a user from an image photographed by the camera, to determine a point on the image corresponding to a center point between pupils of the user, and to determine a viewing angle of the user based on a distance between the point and a center of the image and a distance between the photo sensor and a window of the display unit;
        a reflection intensity calculating unit configured to calculate intensity of reflected light based on intensity of symmetric light incident at an angle specular-symmetric to the viewing angle among the ambient light sensed by the photo sensor; and a luminance compensation unit configured to compensate luminance of input video data in consideration of the intensity of the reflected light calculated by the reflection intensity calculating unit, wherein the viewing angle determining unit is configured to calculate the viewing angle by using the following formula:

$$\tan(\text{viewing angle}) = \frac{\text{the distance between the photo sensor and the window of the display unit}}{\text{the distance between the point and the center of the image}}.$$

2. The display device of claim 1, wherein the photo sensor comprises a plurality of photosensitive pixels having individual coordinates.

3. The display device of claim 1, wherein the luminance compensation unit is configured to compensate a gamma value by adding a gray level value corresponding to the intensity of the reflected light to a gray level value of the input video data.

4. The display device of claim 1, wherein the luminance compensation unit is configured to compensate a gamma value by changing the gamma value in consideration of the intensity of the reflected light.

5. The display device of claim 1, wherein the reflection intensity calculating unit contains information on photo reflectance of the display device.

6. The display device of claim 1, wherein the camera is a CCD camera or a CMOS camera.

7. The display device of claim 1, wherein the window comprises a bezel unit having a photo sensor hole aligned with a center point of the photo sensor.

8. A display device comprising:

a display unit disposed at a front side of the display device;

a camera spaced apart from the display unit and facing the front side of the display device; and a control unit coupled to the display unit and the camera, wherein the control unit comprises:

a viewing angle determining unit configured to identify a point on an image photographed by the camera corresponding to a center point between pupils of a user, and to determine a viewing angle of the user based on a distance between the point and a center of the image;

a reflection intensity calculating unit configured to calculate intensity of reflected light based on the viewing angle by determining a symmetric point that is symmetric to the identified point with respect to the center of the image and to calculate intensity of reflected light at the symmetric point; and a luminance compensation unit configured to compensate luminance in accordance with the intensity of the reflected light calculated by the reflection intensity calculating unit, wherein the viewing angle determining unit is configured to calculate the viewing angle by using the following formula:

$$\tan(\text{viewing angle}) = \frac{\text{the distance between the photo sensor and the window of the display unit}}{\text{the distance between the point and the center of the image}}.$$

9. The display device of claim 8, wherein the luminance compensation unit is configured to compensate a gamma value by adding a gray level value corresponding to the intensity of the reflected light to a gray level value of input video data.

10. The display device of claim 8, wherein the luminance compensation unit is configured to compensate a gamma value by changing the gamma value in consideration of the intensity of the reflected light.

11. The display device of claim 8, wherein the camera is a CCD camera or a CMOS camera.

* * * * *